(12) United States Patent  
Fleenor et al.

(10) Patent No.: US 6,923,579 B2  
(45) Date of Patent: Aug. 2, 2005

(54) FIBER OPTIC COMPONENT MARKING WITH FIBER OPTIC INDICIA

(75) Inventors: Paul A. Fleenor, Hickory, NC (US); Joel C. Rosson, Hickory, NC (US); Dennis M. Knecht, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 149 days.

(21) Appl. No.: 09/998,465

(22) Filed: Nov. 30, 2001

(65) Prior Publication Data

US 2003/0103733 A1 Jun. 5, 2003

(51) Int. Cl.⁷ .............................................. G02B 6/36
(52) U.S. Cl. ............................. 385/78; 385/60; 385/66; 385/84; 385/72
(58) Field of Search .................. 385/53, 60, 66, 385/72, 76–78, 80, 84

(56) References Cited

U.S. PATENT DOCUMENTS

| | | | | |
|---|---|---|---|---|
| 3,807,025 A | * | 4/1974 | Gudmestad | 29/412 |
| 4,691,986 A | * | 9/1987 | Aberson et al. | 385/66 |
| 4,738,507 A | | 4/1988 | Palmquist | 350/96.21 |
| 5,378,509 A | | 1/1995 | Achreiner | 427/556 |
| 5,953,477 A | | 9/1999 | Wach et al. | 385/115 |
| 6,004,405 A | | 12/1999 | Oishi et al. | 148/33.2 |
| 6,137,116 A | | 10/2000 | Amir et al. | 250/559.44 |
| 6,237,370 B1 | | 5/2001 | Bloom | 65/484 |
| 6,283,640 B1 | | 9/2001 | Stephenson et al. | 385/58 |
| 6,287,018 B1 | | 9/2001 | Andrews et al. | 385/60 |
| 6,293,081 B1 | | 9/2001 | Grulick et al. | 57/293 |
| 6,358,874 B1 | | 3/2002 | Kobayashi et al. | 501/105 |
| 6,402,392 B1 | * | 6/2002 | Yarita et al. | 385/84 |
| 6,404,953 B1 | | 6/2002 | Wach et al. | 385/31 |
| 6,542,673 B1 | * | 4/2003 | Holter et al. | 385/52 |
| 2002/0003934 A1 | * | 1/2002 | Clark | 385/99 |

FOREIGN PATENT DOCUMENTS

| | | | | |
|---|---|---|---|---|
| EP | 0719058 A2 | 6/1996 | | H04Q/1/14 |
| EP | 1014127 A2 | 6/2000 | | G02B/6/38 |

OTHER PUBLICATIONS

U.S. Appl. No. 09/706,913,; filed Nov. 6, 2000,;Low–Loss Intermatable Ferrules For Optical Fibers and a Method of Fabrication Thereof; (Pending Application).

* cited by examiner

Primary Examiner—Akm Enayet Ullah  
Assistant Examiner—Kevin S. Wood  
(74) Attorney, Agent, or Firm—Christopher C. Dremann

(57) ABSTRACT

This invention provides a method of marking a fiber optic indicia on the surface of a fiber optic component and the fiber optic component produced thereby. The fiber optic indicia is represented as a predetermined pattern marked on the fiber optic component and is associated with data about at least one of an optical characteristic and a product characteristic. According to a preferred embodiment, the fiber optic indicia is marked on a chamfered surface of a ferrule. The fiber optic indicia may include at least one alphanumerical character, a symbol, or combinations thereof. The method comprises establishing the predetermined pattern of the fiber optic indicia, providing a fiber optic component for marking, preparing a predetermined portion of a surface of the fiber optic component for marking, and marking the predetermined portion in accordance with the predetermined pattern of the fiber optic indicia.

19 Claims, 7 Drawing Sheets

FIBER OPTIC COMPONENT MARKING WITH FIBER OPTIC INDICIA

FIELD OF THE INVENTION

This invention relates generally to the field of fiber optic communications. More particularly, this invention includes a method of marking a fiber optic indicia on a surface of a fiber optic component, such as a fiber optic ferrule and includes the apparatus produced thereby.

BACKGROUND OF THE INVENTION

Fiber optic communications has experienced explosive growth. In just a few years, the transmission of communication signals for voice, video, data, and the like has soared, and more growth is planned as fiber optic communication technology improves and networks expand to provide greater access.

Inherent with any fiber optic network is the need to connect individual optical fibers to other optical fibers by using one of a multitude of fiber optic assemblies. The connection of these fiber optic assemblies must be executed with great care and precision in order to minimize losses in the transmitted communication signal. A common technique for connecting two optical fibers is by terminating an optical fiber with a fiber optic ferrule (hereinafter referred to as "ferrule") and bringing an end face of the ferrule into a mating relationship with the end face of a second ferrule that terminates a second optical fiber. This is known as a ferrule connection. Typically, in a ferrule connection, each optical fiber is mounted in a passageway (e.g., a bore, channel, groove, or any other similar structure) formed through a ferrule, which may be a cylindrical or non-cylindrical shaped body made of any appropriate material.

Choosing a pair of ferrules for a ferrule connection is a selective process and requires identifying information associated with each ferrule, such as, for example, an optical characteristic. Information about an optical characteristic of a ferrule is extremely important because when two optical fibers are connected by a ferrule connection, there exists a potential for loss of optical power due to an imperfect transfer of the fiber optic communication signal from one optical fiber to the other. This loss can be attributed to a number of optical characteristics of the ferrule, such as, for example, offset in the co-axial alignment of the passageways defined by the ferrules, concentricity and eccentricity of the passageway with respect to each ferrule, other geometric characteristics of the end face of each ferrule, geometry of the end portion of the optical fiber, and optical characteristics of the other end of the cable (i.e., end other than the ferrule connection end of the two mated ferrules). Thus, when selecting the ferrules, it is critical to choose ferrules having optical characteristics that maximize the transfer of the fiber optic communication signal between ferrules.

In order to assist in selecting ferrules for the ferrule connection, conventional practice makes use of several known methods of identifying an optical characteristic and using the identification to maximize the fiber optic communication signal transfer between ferrules. For example, a method of "tuning" two connectors, generally, includes measuring the eccentricity of each ferrule in its respective connector, marking each ferrule at the optimum direction of its eccentricity, and rotating one of the ferrules to align the mark on the one ferrule with the mark on the second ferrule in a mating relationship in order to minimize insertion loss. Another marking example, though not a standard in the United States, makes use of color coding to label angle polish endfaces of ferrules to categorize backreflection loss, for example, green is typically used to label the lowest backreflection loss.

In addition to the optical characteristics described above, many fiber optic manufacturers and customers require a way to manage their fiber optic assemblies, such as, for example, using a product characteristic known as a date code to mark a manufacturing date on a connector. Heretofore, no marking method or fiber optic component has been know that provides a consolidated marking tool that combines optical characteristics with product characteristics. Rather, conventional practice dictates that a fiber optic component have a variety of markings, such as, for example, a "tuning" mark, a color label indicative of backreflection loss, and a date code.

Accordingly, there is a need for a marking method and for the fiber optic component produced thereby that achieves these and other benefits.

SUMMARY OF THE INVENTION

Among the objects of this invention is to provide efficient, accurate, and reliable production of fiber optic components marked with a fiber optic indicia that is associated with data on at least one of an optical characteristic and/or product characteristic of a fiber optic assembly. The method may further include using the fiber optic indicia to administer and to mate the fiber optic components. Another object of this invention is to provide the fiber optic components produced thereby. Further details on the objects, uses, advantages, and novel features of this invention are set forth below.

According to a preferred embodiment, a ferrule of a fiber optic assembly is marked with the fiber optic indicia. As used herein, the term "ferrule" includes cylindrical and non-cylindrical ferrules housing single or multiple fibers, such as, for example, BLC, SC, DC, Unicam®, LC, FC, ST®, MTP®, MU, MT-RJ, and other fiber optic connectors. In this embodiment, the ferrule includes: a ferrule body defining a forward end, an opposed rearward end, and at least one passageway extending between the forward end and the rearward end; and a fiber optic indicia formed on a predetermined portion of a surface of the ferrule, wherein the fiber optic indicia comprises a predetermined pattern associated with information about the fiber optic assembly. The predetermined portion may be located on any appropriate surface of the ferrule, such as, for example, an end face of the forward end, a chamfered edge of the forward end, or near the chamfered edge of the forward end.

According to one embodiment, this invention is directed to a method of marking a fiber optic component of a fiber optic assembly that includes establishing a predetermined pattern of a fiber optic indicia, wherein the fiber optic indicia is associated with information of a fiber optic assembly, providing the fiber optic component for marking, preparing a predetermined portion of a surface of the fiber optic component for marking, and marking the predetermined portion of the surface in accordance with the predetermined pattern of the fiber optic indicia. The fiber optic indicia may be alphanumeric characters, symbols, or combinations thereof. The fiber optic indicia is associated with information about the fiber optic assembly, such as, for example, data on an optical characteristic and/or a product characteristic. The information includes data on at least one of the fiber optic components (e.g., a ferrule) and, in some instances, on a plurality of the fiber optic components (e.g., a ferrule, an optical fiber, a splice member, and a shroud) that make up the fiber optic assembly.

According to another embodiment, this invention is directed to a method of identifying an optical characteristic of a fiber optic assembly that includes the steps of aligning a fiber optic indicia formed on a predetermined portion of a surface of a fiber optic component of the fiber optic assembly with a probe of an apparatus for reading the fiber optic indicia, wherein the fiber optic indicia is associated with information about the fiber optic assembly, reading the fiber optic indicia with the probe, and processing the fiber optic indicia to interpret the optical characteristic of the fiber optic assembly, wherein processing comprises associating the information with at least one predetermined optical characteristic identifier of the fiber optic assembly. The method further includes using the fiber optic indicia to administer and/or to mate the fiber optic component.

According to another embodiment, this invention is directed to a method of identifying a product characteristic of a fiber optic assembly that includes the steps of aligning a fiber optic indicia formed on a predetermined portion of a surface of a fiber optic component of the fiber optic assembly with a probe of an apparatus for reading the fiber optic indicia, wherein the fiber optic indicia is associated with information about the fiber optic assembly, reading the fiber optic indicia with the probe, and processing the fiber optic indicia to interpret the product characteristic of the fiber optic assembly, wherein processing comprises associating the information with at least one predetermined product identifier of the fiber optic assembly. The method further includes using the fiber optic indicia to administer and/or to mate the fiber optic component.

BRIEF DESCRIPTION OF THE DRAWINGS

The above and other embodiments, objects, uses, advantages, and novel features of this invention are more clearly understood by reference to the following description taken in connection with the accompanying figures, in which.

DETAILED DESCRIPTION OF THE INVENTION

This invention now will be described more fully hereinafter with reference to the accompanying drawings, in which several embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
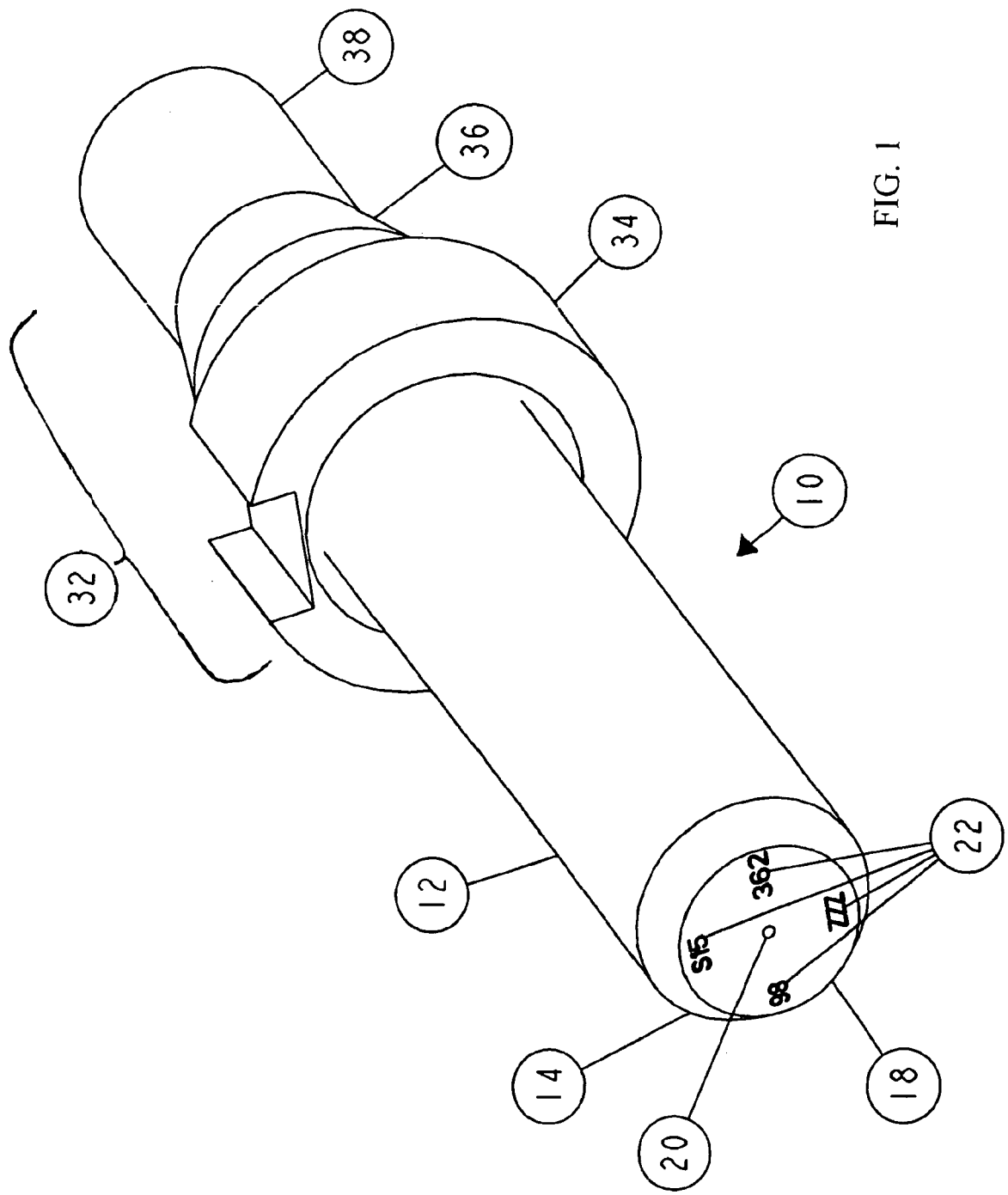
FIG. 1 is a diagrammatic view of a single fiber ferrule illustrating the fiber optic indicia on an end face of the ferrule according to an embodiment of this invention.

Referring to FIG. 1, a ferrule assembly 10 according to an embodiment of this invention is depicted. While the ferrule body 12 may be designed to mate with a variety of fiber optic assemblies, the ferrule assembly is advantageously designed to mate with a fiber optic connector, such as fiber optic connector 40 illustrated in FIGS. 4A and 4B and described in further detail in U.S. Pat. No. 6,030,129, entitled "Fiber Optic Connector And An Associated Method of Fabrication," filed Jun. 11, 1999. The ferrule assembly includes a ferrule body 12 having a forward end 14 and an opposed rearward end 16 (shown in FIG. 4A), at least one passageway 20 extending between the forward end and the rearward end, an end face 18 at the forward end, and a fiber optic indicia 22 on the end face of the ferrule. As used herein, the term "passageway" includes encapsulated passageways (e.g., bores and similar structures), non-encapsulated passageways (e.g., channels, grooves, and similar structures), and combinations thereof. Further, the ferrule body may be cylindrical, non-cylindrical, or any appropriate alternative shape and may be made of any appropriate material, such as, for example, metal, polymer, plastic, ceramic, glass, crystal, and any appropriate combinations thereof.

The ferrule assembly 10 further includes a ferrule holder 32 disposed on the ferrule body 12 so as to extend rearwardly therefrom. The holder includes a collar 34, a tapered section 36 adjacent or rearward of the collar, and a cylindrical tube 38 adjacent or rearward of the tapered section. The ferrule holder is connected to the rearward end 16 of the ferrule body, preferably by an epoxy resin, by an interference fit, or by any other suitable means, so that the collar is generally rearward of the forward end 14 of the ferrule body.

Figure 4A:
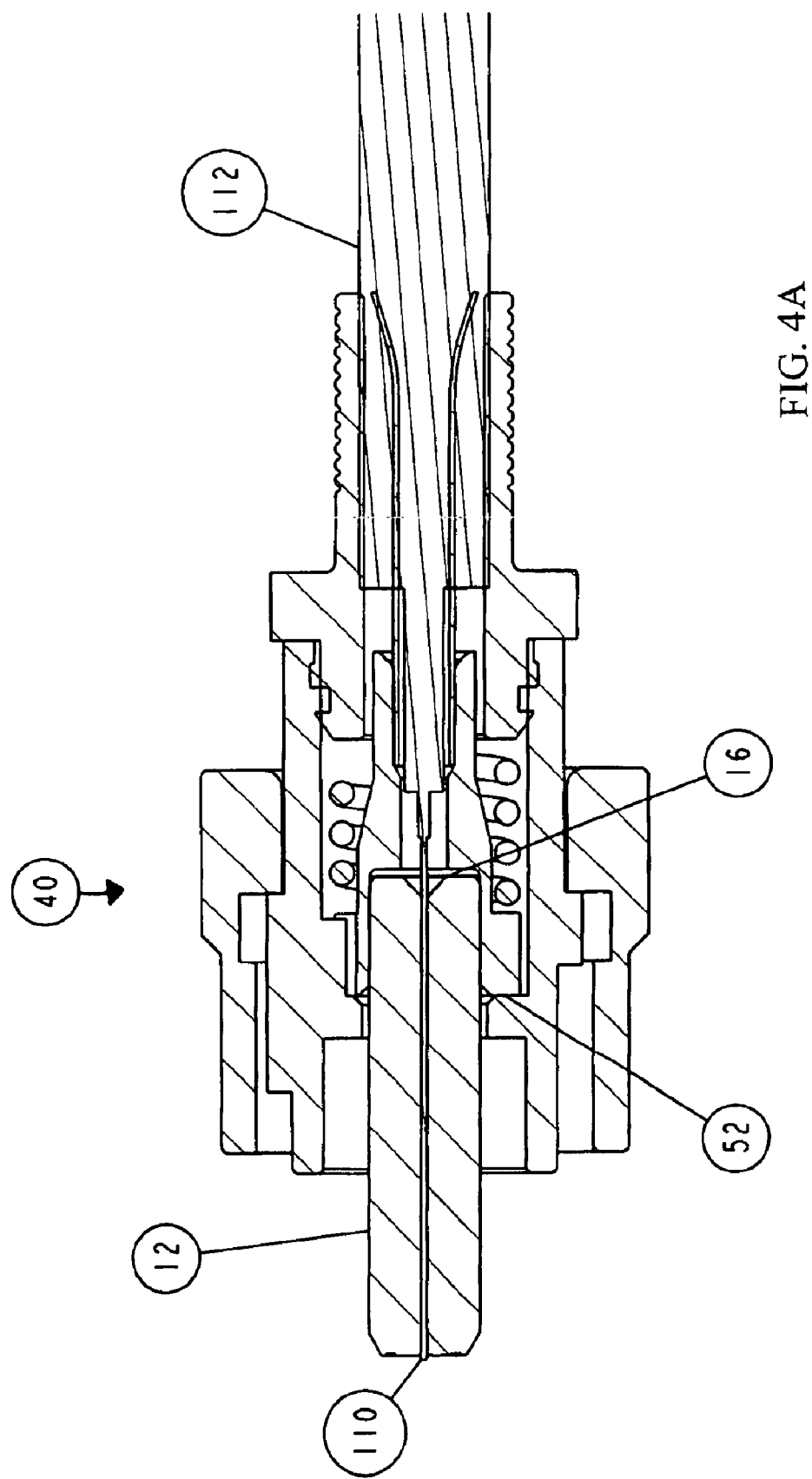
FIG. 4A is a cross-sectional side view of an FC connector assembly illustrating the connection of the various components according to an embodiment of this invention.
Figure 4B:
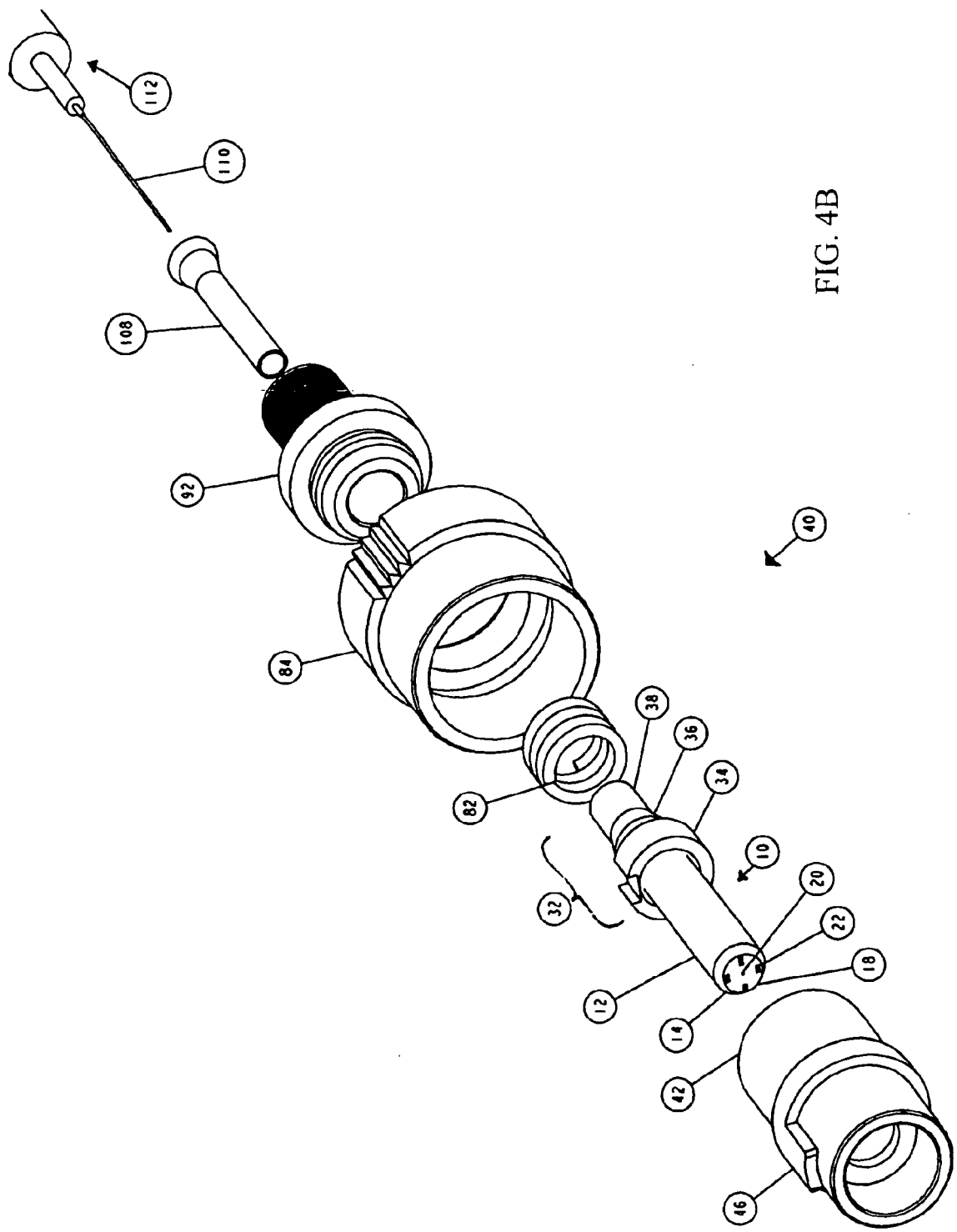
FIG. 4B is an exploded perspective view of the embodiment shown in FIG. 4A.

The fiber optic indicia 22 is associated with information about a fiber optic assembly, such as the fiber optic connector 40 depicted in FIGS. 4A and 4B and described in further detail below. As illustrated in FIGS. 4A and 4B, the fiber optic connector usually includes a shroud 46, a ferrule assembly 10, a spring 82, a coupling nut 84, a crimp body 92, a lead-in tube 108, an optical fiber 110, and an optical fiber cable 112. The fiber optic connector is mounted on an end portion of the optical fiber that extends through the fiber optic connector into the ferrule assembly. The end portion of the optical fiber extending from the ferrule assembly is mated with another optical fiber extending from a second fiber optic connector.

The ferrule assembly is disposed in the shroud so that the ferrule body 12 extends through an inwardly extending ring 52 of the shroud 46 to allow the ferrule holder collar 34 of the ferrule assembly 10 to contact the ring thereby retaining the ferrule assembly within the connector. The fiber optic connector 40 also generally includes a spring 82 that is disposed over the cylindrical tube 38 of the ferrule holder 32. The outside diameter of the spring is less than the inside diameter of a first end 42 of the shroud 46 so that the spring fits inside the first end of the shroud. The spring urges the ferrule assembly 10 against the ring of the shroud so that the ferrule body extends through the shroud so as to be in a position to cooperatively engage a ferrule body of a second connector.

A coupling nut 84 is slidably mounted upon the shroud 46. As shown in FIG. 4A, the shroud 46, ferrule assembly 10, spring 82, and coupling nut 84 are maintained in their respective positions by a crimp body 92. The lead-in tube 108 may also be securely inserted into the crimp body 96 to facilitate the insertion of the optical fiber 110 into the passageway 20 of the ferrule body 12. Further, the crimp body is securely connected to the shroud by ultrasonic welding or any other suitable means.

Figure 3:
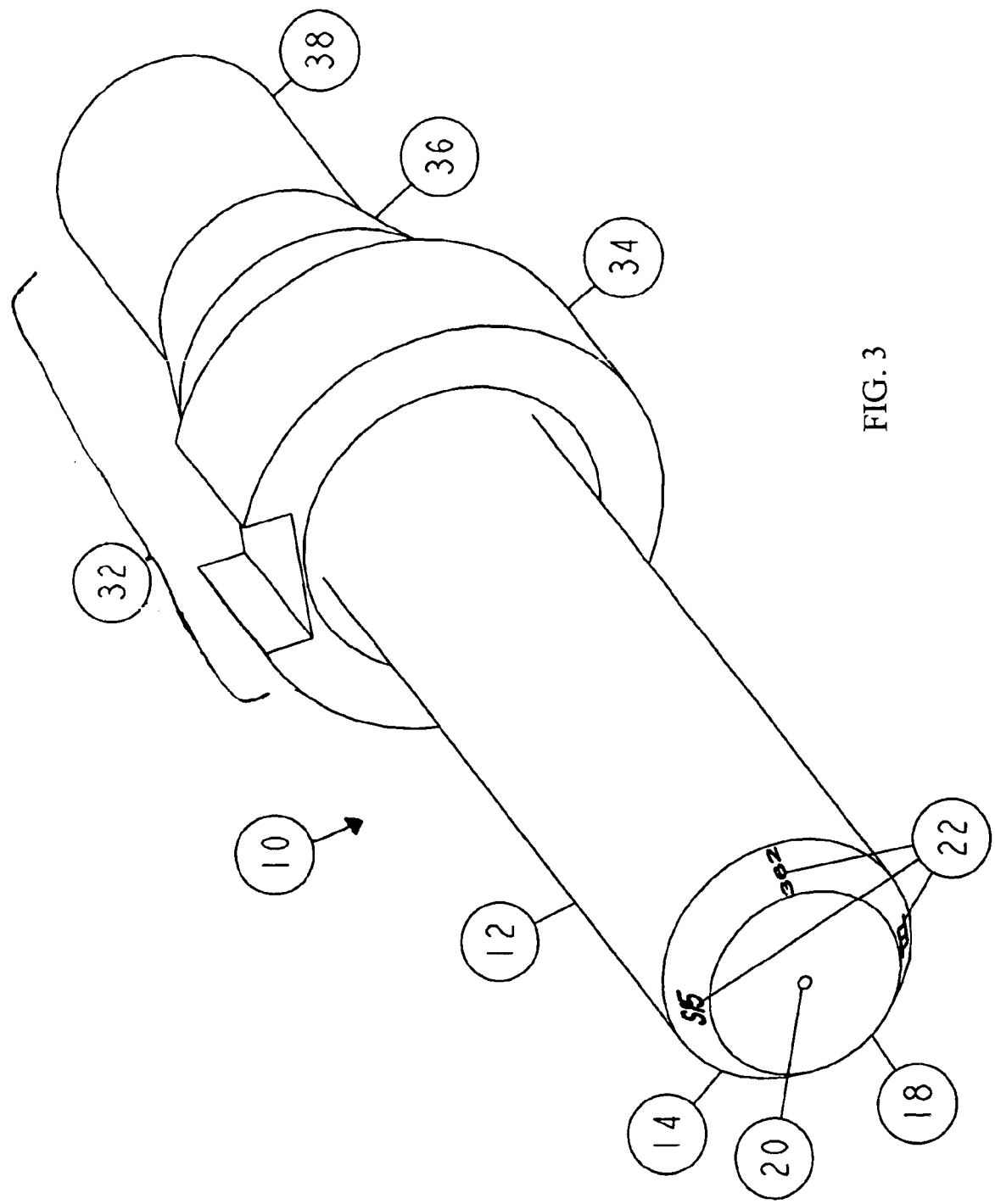
FIG. 3 is a diagrammatic view of a single fiber ferrule illustrating the fiber optic indicia on a chamfered edge of the ferrule according to an embodiment of this invention.

Referring now to FIG. 3, the fiber optic indicia 22 is preferably located within at least about 150 microns from the opening of the passageway 20, and, more preferably is located on or near a chamfered edge 26 of the ferrule body 12. In some instances, the chamfered edge may be a more desirable location at which the fiber optic indicia is marked. For example, some instances include when the wear and tear on the chamfered edge is less that other portions of the ferrule and when there is better accessibility to the chamfered edge for marking or for reading.

Figure 5:
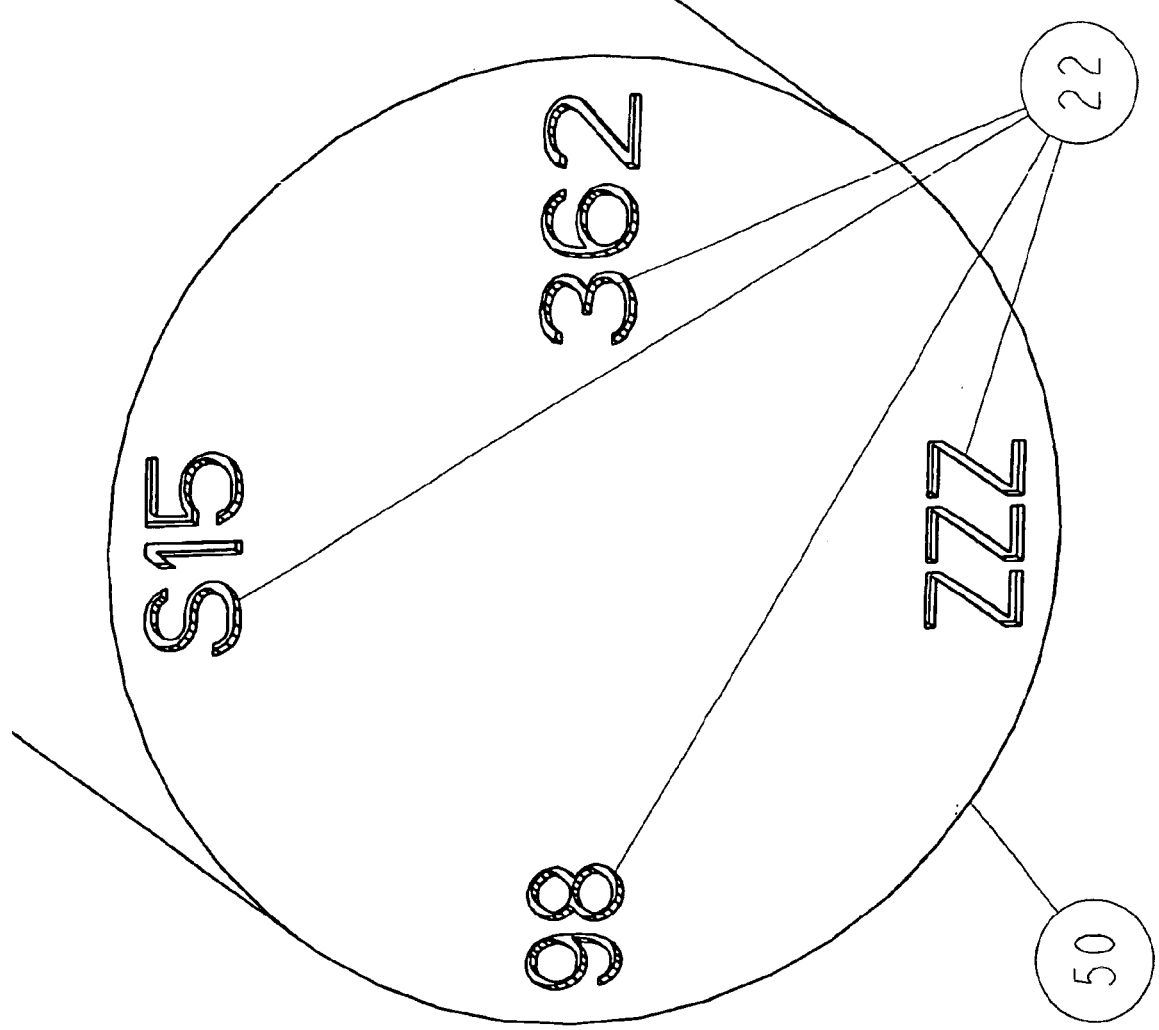
FIG. 5 is an enlarged view of an end portion of an optical fiber illustrating the fiber optic indicia according to an embodiment of this invention.

According to the embodiment depicted in FIG. 5, the ferrule assembly 10 further includes an optical fiber 110 extending at least partially through the passageway 20 such that an end portion 50 of the optical fiber is exposed at the end face 18 of the ferrule body 12. The fiber optic indicia 22 is located on the end portion of the optical fiber. Alternatively, the fiber optic indicia may be located on other predetermined portions of the optical fiber.

Figure 6:
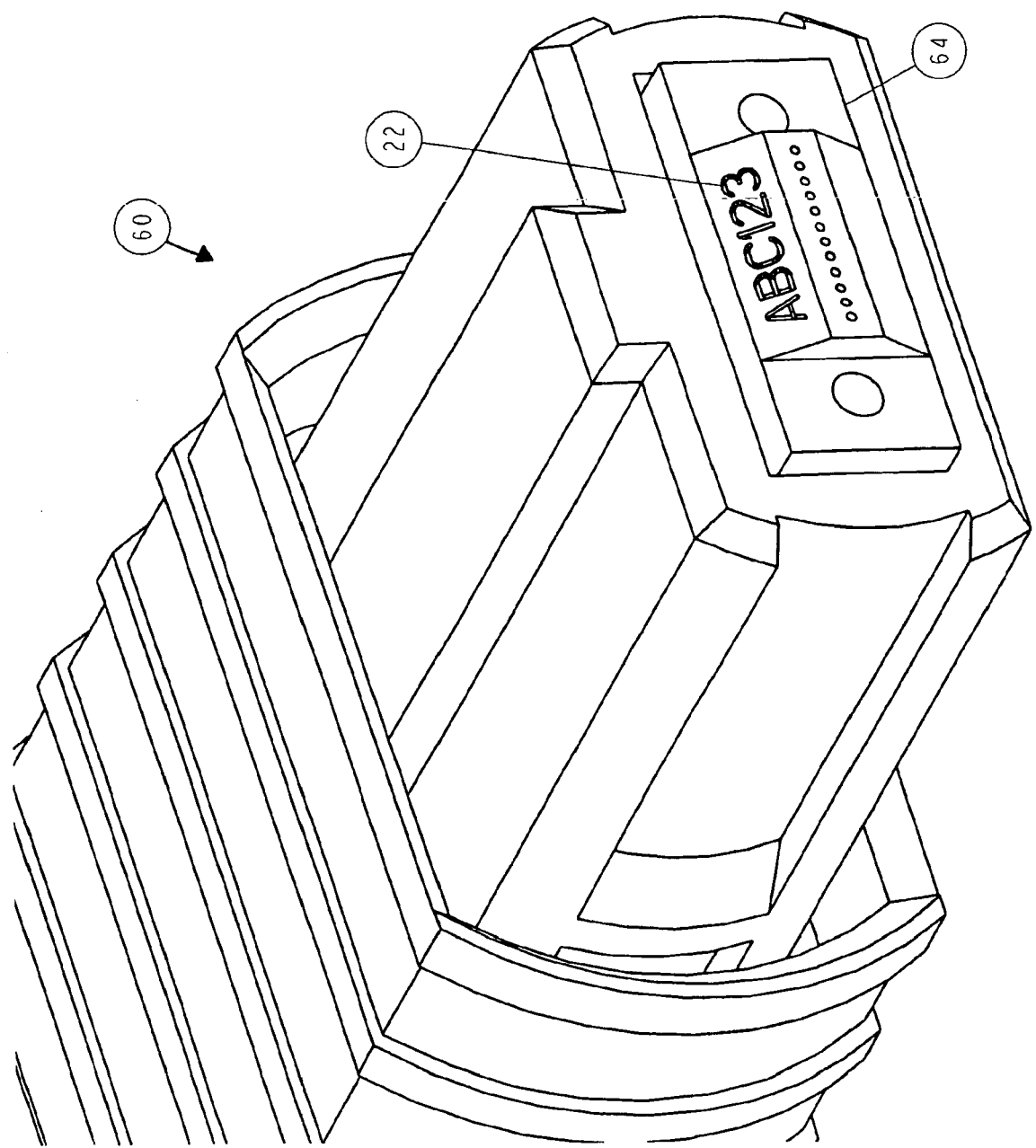
FIG. 6 is a diagrammatic view of an MTP connector illustrating the fiber optic indicia on the end face of a multifiber ferrule according to an embodiment of this invention.

While the embodiments above are related to a cylindrical, single fiber ferrule, this invention also applies to non-cylindrical ferrules as well as to ferrules housing multiple fibers. For example, FIG. 6 depicts the fiber optic indicia 22 on the end face of a multifiber ferrule 64 of an MTP connector assembly 60.

The fiber optic indicia 22 may be at least one of an alphanumeric character, a symbol, or combinations thereof. For example, the fiber optic indicia of FIGS. 1, 3, 4B, and 5 are illustrated with a variety of alphanumeric characters arranged about an opening of the passageway 20 on the end face 18 of the ferrule body 12. Alternatively, the fiber optic indicia may be represented as a symbol, such as, for example, the UPC symbol depicted in FIG. 2. According to an embodiment, the marking may be accomplished by a variety of methods, such as, for example, laser etching, applying color, differentiating planar color surfaces, molding a component with a portion of a raised or a lowered surface area, and the like. Alternatively, the marking may be accomplished by applying a film, substrate, a light sensitive material, magnetic material, or the like applied to a predetermined portion of the component surface. Further, as implied in the foregoing description, the fiber optic indicia may be naked to the human eye, such as a transparent film or very small mark that is detectable by ultra violet scanning.

The fiber optic indicia 22 is associated with information about the fiber optic assembly, such as, the FC connector assembly 40 or the MTP connector assembly 60. The information includes data about at least one optical characteristic and/or a product characteristic. The optical characteristic data may include ferrule end face geometry measurement data (e.g., concentricity data, eccentricity data, etc.), ferrule dimension data (e.g., 1.25 mm OD, 125.5 um ID, etc.), end face fiber protrusion data (e.g., dimensions associated with the end portion of the optical fiber extending from the end face of the ferrule), and ferrule mode data (e.g., single mode or multi mode). Further, the optical characteristic data may include information associated with optical performance data, such as, for example, attenuation, back reflection, insertion loss, and the like. As described above, these optical characteristics may be critical measurements for designing a ferrule connection that maximizes the transfer of the fiber optic communication signal from one ferrule to the other. Still further, the information may include data associated with a product characteristic. As used herein, the term "product characteristic" includes data related to design specifications, manufacturing data (e.g., date codes, component supplier data, qualitative data, such as, production cost, production time, assembly line, and other similar manufacturing data), installation instructions, sales data (e.g., retail cost, customer buying fiber optic assembly, etc.), repair history, and other similar information associated with each of the components of the fiber optic assembly.

Further, the information may be associated with a plurality of fiber optic components that comprise the fiber optic assembly, such as, for example, the shroud 46, the spring 82, the crimp body 92, and other related components. Still further, the information may include data on a plurality of multiple optical characteristics and/or multiple product characteristics of the components that comprise the fiber optic assembly. For example, fiber optic indicia 22 in FIG. 1 denotes an "S15" at the top, "362" to the right, "ZZZ" at the bottom, and "01" to the left of the end face of the ferrule body. "S15" denotes that the ferrule assembly is a single mode ferrule with a concentricity error or 0.15 um; "362" denotes the Julian date that the ferrule assembly was manufactured; "ZZZ" is an alphanumeric serial code; and "01" denotes the year that the fiber optic connector was manufactured. As will be obvious to one of ordinary skill in the art, there are numerous arrangements and lay-outs of the alphanumeric characters, symbols, and combinations that could be marked on or about the predetermined portion of the surface of the fiber optic component, and this invention encompasses alternate arrangements and lay-outs not depicted in the drawings.

The data associated with the fiber optic indicia may be maintained in a secure information management system accessible by a variety of users over a public or private network, such as, for example, the world wide web. Further, the information management system that stores, processes, and manages the data may be dynamically programmed to customize a portion of the data for each user. For example, a manufacturer of the fiber optic component might have access to all of the data (i.e., optical characteristic and product characteristic data), while a customer might only have access to a limited portion of the data (e.g., a manufacturer wouldn't share certain qualitative data that might be maintained as a trade secret). Accordingly, the fiber optic indicia provides a tool for manufacturers to accurately and efficiently automate some of the production process, reduce costs, and expedite production. Further, the fiber optic indicia provides a tool for customers and other users to quickly and accurately identify fiber optic assemblies, optimally select ferrules that maximize signal transfer in a ferrule connection, reduce network construction and maintenance costs, and monitor quality initiatives.

The fiber optic components described earlier in the specification may be marked in accordance with a method that includes: (1) establishing a predetermined pattern of a fiber optic indicia, wherein the fiber optic indicia is associated with information of a fiber optic assembly; (2) providing the fiber optic component for marking; (3) preparing a predetermined portion of a surface of the fiber optic component for marking; and (4) marking the predetermined portion of the surface in accordance with the predetermined pattern of the fiber optic indicia. The fiber optic indicia is associated with information about the fiber optic assembly, such as, for example, data on at least one of an optical characteristic and/or a product characteristic.

Figure 2:
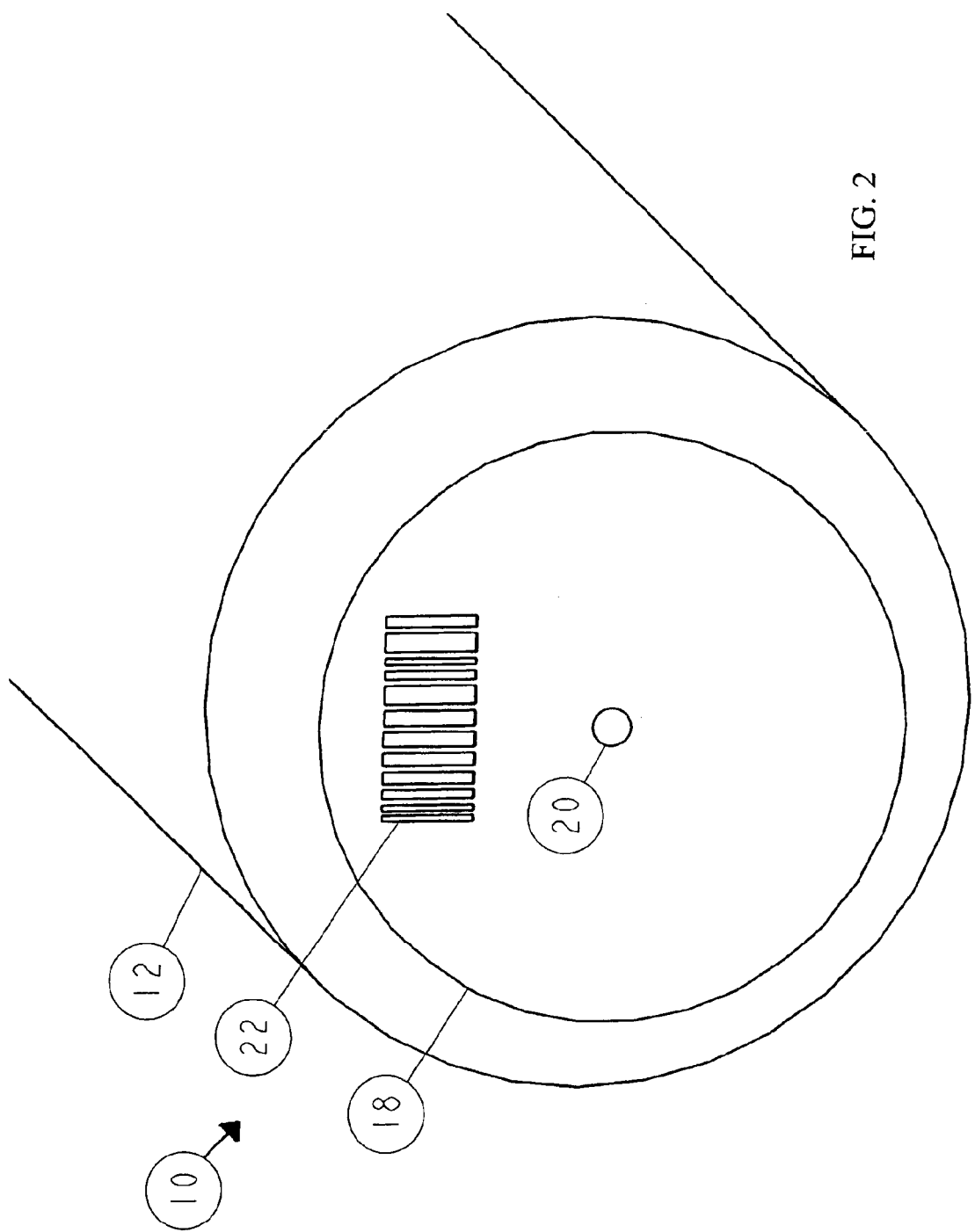
FIG. 2 is an enlarged diagrammatic view of a portion of an end face of a single fiber ferrule illustrating the fiber optic indicia on the end face of a ferrule according to an embodiment of this invention.

In accordance with the marking method above, the predetermined pattern may take on a variety of patterns, such as the patterns described above and in the drawings. For example, the predetermined pattern may be a UPC symbol marked above the passageway 20 (as illustrated in FIG. 2) that is associated with data on at least one of an optical characteristic and/or product characteristic of the fiber optic assembly. The fiber optic indicia 22 may be associated with the data prior to, during, and/or subsequent to marking. Further, the data may be measured or obtained prior to, during, and/or or subsequent to the marking.

Typically, a manufacture or a supplier produces the fiber optic component for marking; however, other third parties might also produce the component (e.g., a customer may decide to mark a fiber optic component that it purchases from a manufacturer). After the component is produced, it is provided for marking. Prior to marking, a portion of the surface of the fiber optic connector is chosen for marking. As described above, this surface might be a shroud, an end portion or chamfered edge of a ferrule, or any other appropriate surface. Thereafter, the portion of the surface to be marked is prepared for marking. For example, if the method of marking is applying a color to the shroud, then that portion of the shroud may have to be cleaned prior to marking. Finally, the portion of the surface is marked with the predetermined pattern of the fiber optic indicia.

According to an embodiment that makes use of the advantages of the fiber optic indicia described above, a method of identifying an optical characteristic of a fiber optic assembly includes the steps of: (1) aligning a fiber optic indicia formed on a predetermined portion of a surface of a fiber optic component of the fiber optic assembly with a probe of an apparatus for reading the fiber optic indicia, wherein the fiber optic indicia is associated with information about the fiber optic assembly; (2) reading the fiber optic indicia with the probe; and (3) processing the fiber optic indicia to interpret the optical characteristic of the fiber optic assembly, wherein processing comprises associating the information with at least one predetermined optical characteristic identifier of the fiber optic assembly. Typically, the predetermined optical characteristic is a selection of at least one measurement; however, some optical characteristics (e.g., ferrule mode data) are not necessarily measurements.

Similar to the method of identifying the optical characteristic, a method of identifying a product characteristic of a fiber optic assembly includes the steps of: (1) aligning a fiber optic indicia formed on a predetermined portion of a surface of a fiber optic component of the fiber optic assembly with a probe of an apparatus for reading the fiber optic indicia, wherein the fiber optic indicia is associated with information about the fiber optic assembly; (2) reading the fiber optic indicia with the probe; and 3) processing the fiber optic indicia to interpret the product characteristic of the fiber optic assembly, wherein processing comprises associating the information with at least one predetermined product identifier of the fiber optic assembly. Both the method for identifying the optical characteristic and for identifying the product characteristic further includes using the fiber optic indicia to administer and/or to mate the fiber optic component. For example, the data may be maintained in the information management system as described above.

Many modifications and other embodiments of the invention will come to mind to one skilled in the art to which this invention pertains having the benefit of the teachings presented in the foregoing descriptions and the associated drawings. For example, the embodiments discussed herein are directed to an FC connector assembly and an MTP connector assembly. However, this invention applies to a variety of connectors, such as, for example, BLC, SC, DC, Unicam, LC, FC, ST, MTP, MU, MT-RJ, and other fiber optic connectors. Still further, the fiber optic indicia may also be a combination of alphanumeric characters and/or symbols. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A ferrule for a fiber optic assembly, comprising:
    a ferrule body having an outer periphery and defining a forward end, an opposed rearward end, and at least one passageway extending between the forward end and the rearward end, the forward end defining an end face between the passageway and the outer periphery; and
    a fiber optic indicia formed on the end face defined by the forward end of the ferrule body, wherein the fiber optic indicia comprises a predetermined pattern associated with data about the fiber optic assembly, wherein the data comprises at least one of an optical characteristic and a product characteristic.

2. The ferrule of claim 1, wherein the at least one passageway comprises at least one passageway having a respective opening at the forward end.

3. The ferrule of claim 2, wherein the fiber optic indicia is located within at least about 150 microns from the opening of the at least one passageway at the forward end.

4. The ferrule of claim 1, wherein the ferrule body further comprises:
    an optical fiber extending at least partially through the at least one passageway such that an end portion of the optical fiber is exposed at the end face defined by the forward end of the ferrule.

5. The ferrule of claim 4, wherein the fiber optic indicia is located on the optical fiber exposed at the end face defined by the forward end.

6. The ferrule of claim 1, wherein the ferrule is made from at least one of the following materials:
    metal;
    polymer;
    plastic;
    ceramic;
    glass; and
    crystal.

7. A method of marking a ferrule of a fiber optic assembly, comprising:
    establishing a predetermined pattern of a fiber optic indicia, wherein the fiber optic indicia is associated with information about the fiber optic assembly;
    providing the ferrule for marking, the ferrule having an outer periphery and defining a rearward end, a forward end opposite the rearward end and a passageway extending between the rearward end and the forward end, the forward end defining an end face between the passageway and the outer periphery;
    preparing the end face of the ferrule for marking; and
    marking the end face of the ferrule in accordance with the predetermined pattern of the fiber optic indicia.

8. The method of claim 7, wherein the fiber optic indicia comprises at least one alphanumeric character.

9. The method of claim 7, wherein the fiber optic indicia comprises at least one symbol.

10. The method of claim 7, wherein marking the end face of the ferrule comprises laser etching the end face of the ferrule.

11. The method of claim 7, wherein marking the end face of the ferrule comprises applying color to the end face of the ferrule.

12. The method of claim 7, wherein marking the end face of the ferrule comprises differentiating planar colors of the fiber optic indicia and the end face of the ferrule.

13. The method of claim 7, wherein the fiber optic indicia comprises at least one of the following:

a film;

a substrate;

a light sensitive indicia; and a magnetic substance.

14. The method of claim 7, wherein the information comprises data about at least one optical characteristic of the fiber optic assembly.

15. The method of claim 14, wherein the optical characteristic comprises at least one of the following:

ferrule end face geometry measurement data;

ferrule dimension data;

end face fiber protrusion; and ferrule mode data.

16. The method of claim 14, wherein the optical characteristic comprises performance data of the fiber optic assembly.

17. The method of claim 16, wherein the performance data comprises at least one of the following:

attenuation data;

back reflection data; and insertion loss data.

18. The method of claim 14, wherein the information comprises data about at least one product characteristic of the fiber optic assembly.

19. A method of marking a ferrule of a fiber optic assembly, comprising:

establishing a predetermined pattern of a fiber optic indicia, wherein the fiber optic indicia is associated with information about the fiber optic assembly;

providing the ferrule for marking, the ferrule having an outer periphery and defining a rearward end, a forward end opposite the rearward end and a passageway extending between the rearward end and the forward end, the forward end defining an end face between the passageway and the outer periphery;

preparing the end face of the ferrule for marking;

marking the end face in accordance with the predetermined pattern of the fiber optic indicia;

administering the fiber optic assembly in accordance with the fiber optic indicia; and using the fiber optic indicia to select at least a pair of ferrules that maximize the transfer of a transmitted communication signal in a ferrule connection.

* * * * *